United States Patent [19]
Borsboom et al.

[11] Patent Number: 5,897,850
[45] Date of Patent: * Apr. 27, 1999

[54] PROCESS FOR REMOVING ELEMENTAL SULFUR FROM A GAS STREAM

[75] Inventors: Johannes Borsboom, Rijswijk; Jan Adolf Lagas, Monnickendam, both of Netherlands

[73] Assignees: Comprimo B.V., Amsterdam; Gastec N.V., Apeldorn, both of Netherlands

[*] Notice: This patent is subject to a terminal disclaimer.

[21] Appl. No.: 08/935,526

[22] Filed: Sep. 23, 1997

Related U.S. Application Data

[63] Continuation of application No. 08/756,395, Nov. 27, 1996, abandoned, which is a continuation of application No. 08/459,268, Jun. 2, 1995, abandoned, which is a continuation-in-part of application No. 08/343,655, Nov. 22, 1994, abandoned.

[30]     Foreign Application Priority Data

Nov. 30, 1993 [NL] Netherlands ............................ 9302081

[51] Int. Cl.$^6$ .................................................. C01B 17/02
[52] U.S. Cl. ...................... 423/576.2; 23/293 S; 95/291; 95/290; 423/574.1
[58] Field of Search ............................. 423/573.1, 574.1, 423/576, 576.2, 576.8; 23/243, 244 R, 308; 95/291, 290

[56]            References Cited

U.S. PATENT DOCUMENTS

| | | | |
|---|---|---|---|
| 2,876,070 | 3/1959 | Roberts, Jr. ........................... | 423/574.1 |
| 2,876,071 | 3/1959 | Updegraff ............................. | 423/576.1 |
| 3,551,113 | 12/1970 | Cash ......................................... | 23/262 |
| 3,838,979 | 10/1974 | Sims ..................................... | 423/578.1 |
| 4,391,791 | 7/1983 | Palm et al. ................................. | 55/27 |
| 4,526,590 | 7/1985 | Palm et al. ............................. | 423/574 |
| 4,988,494 | 1/1991 | Lagas et al. .......................... | 423/576.8 |

FOREIGN PATENT DOCUMENTS

| | | | |
|---|---|---|---|
| 2572952 | 5/1986 | France . | |
| 1083790 | 6/1960 | Germany . | |
| 80-61393 | 5/1975 | Japan ................................. | 423/576.2 |
| 51-45008 | 9/1982 | Japan ................................. | 423/526.2 |

OTHER PUBLICATIONS

Paskall, Howard C. Sulfuacondensor Function and Problem Arears, Western Research Amsterdam 1981.

*Primary Examiner*—Gary P. Straub
*Attorney, Agent, or Firm*—Weingarten, Schurgin, Gagnebin & Hayes LLP

[57]            ABSTRACT

A process for the recovery of sulfur from a hydrogen sulfide containing gas, comprising oxidizing hydrogen sulfide with oxygen, and then reacting the product gas of this oxidation further by using at least two catalytic stages. The $H_2S$ concentration in the gas leaving the last catalytic stage is controlled to have a value ranging between 0.8 and 3% by volume by reducing the quantity of combustion or oxidation air passed to the oxidation stage and/or causing a portion of the hydrogen sulfide-containing feedstock gas to bypass the oxidation stage and to be added to the gas flowing to a catalytic stage. The gas leaving the last catalytic stage is introduced into a heat exchanger having a wall temperature below the solidification point of sulfur and above the dew point of water, wherein the sulfur deposits on the heat exchanger wall and is removed with the aid of gravity.

26 Claims, 4 Drawing Sheets

PROCESS FOR REMOVING ELEMENTAL SULFUR FROM A GAS STREAM

This application is continuation of application Ser. No. 08/756,395, now abandoned filed Nov. 27, 1996, which is a continuation of application Ser. No. 08/459,268, filed Jun. 2, 1995, abandoned which is a continuation-in-part of application Ser. No. 08/343,655, filed Nov. 22, 1994 abandoned.

This invention relates to a process for removing elemental sulfur which is present in a gas in the form of vapor and/or entrained particles, in which process the gas to be treated is cooled.

Various methods are known for removing sulfur-containing compounds from gas streams. A well known method is the so-called Claus process. According to this method, in a thermal stage hydrogen sulfide is partially oxidized with oxygen from the air to form sulfur dioxide. Then, in the thermal stage and two or three catalytic stages, the reaction occurs, whereby from the sulfur dioxide formed and the residual hydrogen sulfide, sulfur and water are formed. The sulfur recovery degree of the conventional Claus process is 97–98% at a maximum. This percentage is relatively low in this branch of the technique, which gives rise to the need for methods by which the degree of recovery could be increased.

With the recently developed SUPERCLAUS™ process, theoretically sulfur recovery percentages of up to 99.5% can be achieved. This process utilizes a reactor which is arranged downstream of two or three Claus reactors, and in which the residual hydrogen sulfide is selectively oxidized to sulfur. In practice, the SUPERCLAUS process in which the selective oxidation stage is implemented with gas which has passed three Claus reactors yields sulfur recovery percentages of about 99.3%.

The SUPERCLAUS process is described in detail in U.S. Pat. No. 4,988,494, the contents thereof being incorporated herein by reference.

The key features of the patented SUPERCLAUS™ process are:

1. An $H_2S$-shifted Claus reaction ($H_2S/SO_2$ ratio higher than 2 in combination with a selective oxidation reactor stage in which the $H_2S$ present in the gas from the last Claus reactor stage is oxidized to elemental sulfur employing a selective oxidation catalyst which is substantially insensitive to the presence of water vapor in the process gas and ineffective in promoting the reverse Claus reaction:

$$3/n\ S_n + 2H_2O \rightleftharpoons 2H_2S + SO_2.$$

2. The $H_2S$ in the gas leaving the second Claus reactor stage is controlled between 0.8 and 3.0 vol-% by either reducing the combustion air to the main burner of the thermal stage or by-passing a portion of the Claus feed gas around the main burner.

3. The oxidation of $H_2S$ in the selective oxidation reactor stage is carried out in the presence of a considerable amount of water vapor and with excess air (oxygen), resulting in an excess of oxygen being employed in the total process compared to conventional Claus plant operation.

It has been found that about 0.4% of the 0.7% residual sulfur in the tail gas of a SUPERCLAUS plant is present in the form of elemental sulfur, while the other sulfur compounds are mainly present in the form of hydrogen sulfide and sulfur dioxide.

The official requirements regarding desulfurization efficiency are becoming increasingly stringent. The German authorities, for instance, require that sulfur recovery plants with a sulfur production exceeding 50 tons/day have a desulfurization efficiency of at least 99.5%.

To further increase the practical efficiency of a SUPERCLAUS plant, it is possible to resort to a different process, for instance the SCOT process. With the aid of this process, sulfur compounds which are still present in the Claus residual gas are removed with the aid of organic compounds. However, such a process is very costly, while the equipment for implementing this process is relatively large in size.

According to the invention, it has now been found that higher sulfur recovery percentages can be achieved if sulfur-containing gas obtained from the SUPERCLAUS process is cooled down in a heat exchanger; the wall of which has a temperature which is lower than the solidification point of sulfur and which is higher than the dew point of water if this is present in the gas.

Possibly, an explanation for the underlying principle of this invention can be found in the product properties of elemental sulfur in general, since this substance accounts for the greater part of the residual sulfur content of the tail gas of a SUPERCLAUS sulfur recovery plant.

From Kirk-Othmer, Encyclopedia of Chemical Technology, third edition, Volume 22, John Wiley & Sons, pages 78 et seq, it is known that liquid elemental sulfur crystallizes at atmospheric pressure at 114.5° C. in the monoclinic crystal form, which form has a density of 1.96 g/cm³. Further, it is known that solid sulfur, at atmospheric pressure and at 95.5° C., passes into the rhombic form having a density of 2.07 g/cm³. Possibly, the difference in the densities of these two crystal forms is the key to the present invention.

The present invention might then make use of the fact that the density increases suddenly at each phase transition in the crystal form (amorphous→monoclinic→rhombic) and the volume of the amount of solid sulfur accordingly decreases by about 2% from amorphous to monoclinic and by about 6% from monoclinic to rhombic. As a result of these sudden changes in volume, solid sulfur can come off a surface on which it has been deposited. It is stressed that this theory is a possible explanation of the advantages of the process according to the invention. This theoretical explanation may therefore not be construed as limiting the present invention.

The present invention relates to a process for the recovery of sulfur from a hydrogen sulfide containing gas, which comprises:

oxidizing hydrogen sulfide in a gaseous stream with oxygen in an oxidation stage;

reacting the product gas of this oxidation further in at least two catalytic stages, in accordance with the equation:

$$2H_2S + SO_2 \rightleftharpoons 2H_2O + 3/n\ S_n,$$

the $H_2S$ concentration in the gas leaving the last of said at least two catalytic stages being controlled to have a value ranging between 0.8 and 3% by volume by employing at least one of the steps a and b:

a) reducing the quantity of combustion or oxidation air passed to the oxidation stage;

b) causing a portion of the hydrogen sulfide containing feedstock gas to by-pass the oxidation stage and to be added to the gas flowing to one of said at least two catalytic stages; following by selectively oxidizing $H_2S$ in the gas leaving the last of said at least two catalytic stages to sulfur, employing for this purpose a catalytic stage including a selective oxidation catalyst which is substantially insensitive to the presence of water vapor in the gas stream, is ineffective in promoting establishment of the equilibrium $$2H_2S + SO_2 \rightleftharpoons 2H_2O + 3/n\ S_n,$$

and is effective to promote oxidation of $H_2S$ to sulfur in the presence of water vapor;

and subsequently introducing the gas leaving the said catalytic stage including the selective oxidation catalyst into a heat exchanger wherein it is ensured, with the aid of the temperature and/or the flow velocity of the cooling medium, that the wall of the heat exchanger has a temperature below the solidification point of sulfur and above the dew point of water, if any, present in the gas, and wherein the deposited sulfur is removed under the influence of gravity.

In a preferred embodiment, the heat exchanger is incorporated in the final part of the catalytic stage. This means that the part of the catalytic stage following the catalytic bed, acts as heat exchanger.

According to the present invention, hydrogen sulfide present in the gaseous feedstock to a Claus converter is partially oxidized with oxygen, whereafter the product gas from the oxidative stage is reacted further, by using at least two catalytic stages, in accordance with the equation:

$$2H_2S + SO_2 \rightleftharpoons 2H_2O + 3/n\, S_n \qquad (2)$$

with the $H_2S$ concentration in the residual gas leaving the last catalytic stage being controlled to have a value of between 0.8 and 5% by volume by reducing the amount of combustion or oxidation air passed to the oxidation stage, and/or by causing a portion of the hydrogen sulfide containing feedstock to by-pass the oxidation stage, and adding it to the gas flowing to a catalytic stage.

This process step in accordance with the invention offers the advantage that no sensitive control of the process is required, because it is only the concentration of the $H_2S$ in the residual gas and not the ratios of $H_2S:SO_2$ therein which play a role. Claus catalysts are sensitive to sulfation under the influence of traces of oxygen in the reaction gases. In the process according to the present invention, as the Claus reaction proceeds, an ever increasing excess of $H_2S$ is formed in the reaction gases, in particular in the last Claus reactor. This excess of $H_2S$ reduces any sulfate that has been formed, whereby the problem of sulfation of the catalysts is counteracted and a longer service life thereof is obtained.

The concentration of the hydrogen sulfide gas in the residual gas can be controlled in several ways. Thus, for example, the signal from an $H_2S$ analyzer in the residual gas can be used to set or adjust the amount of combustion air or oxidation air supplied to the oxidation stage. The signal can also be used to pass, as a function thereof, a variable amount of $H_2S$ direct to the first or second catalytic reactor or to both reactors.

Measurements conducted in a Claus plant comprising two catalytic stages and operated using the present invention, indicated that, to provide a proportion of 0.8–5% by volume of $H_2S$ in the residual gas, an amount of air must be supplied that is equivalent to 86–98.5% of the stoichiometric quantity (i.e., relative to the amount of air required to combust one-third of the amount of $H_2S$ supplied to the burner). It will be clear, where reference is made to a quantity of air, what is meant is the amount of gas containing the required amount of oxygen. When the amount of air passed to the Claus burner is not reduced but a portion of the gaseous feedstock is caused to by-pass the oxidation stage, approximately 1.5–14% of the available quantity of $H_2S$ containing gas must be by-passed which is dictated by the reactions which occur.

It has further been found that a concentration of $H_2S$ in the residual gas of about 1–3% by volume corresponds to an $H_2S/SO_2$ ratio therein of about 15–800, while with increasing percentages by volume of $H_2S$ in the residual gas—within the range defined according to the invention—this value rapidly becomes infinitely high, so that only immeasurably small quantities of $SO_2$ are present. This offers an additional advantage, because for the further processing of this gas the removal of $SO_2$ is unnecessary.

The process according to the invention can be suitably applied for the treatment of gases containing hydrogen sulfide, but also for gases containing both hydrogen sulfide and substantial quantities of ammonia; in the latter case, the temperature in the combustion chamber should be at least 1250° C.

In the process according to the invention, the hydrogen sulfide gas remaining in the residual gas can be processed to form sulfur by oxidizing the remaining gaseous hydrogen sulfide with air in an oxidation stage to form sulfur in accordance with the following reaction:

$$2H_2S + O_2 \rightarrow 2H_2O + 2/n\, S_n. \qquad (3)$$

When the concentration of the hydrogen sulfide leaving the last mentioned catalytic stage is maintained at a value of between 0.8 and 5% by volume, an optimum sulfur recovery percentage of 98.0–99.8 can be obtained. This oxidation can in principle take place in two ways, namely, by dry-bed oxidation or by oxidation in a liquid, in which, in general, sulfur and water vapor have first been removed from the residual gas.

In the dry-bed oxidation, the $H_2S$ concentration in the residual gas is preferably maintained between 0.8 and 3% by volume, because above 3% by volume of $H_2S$ the total sulfur recovery percentage is decreased. Commonly, when the $H_2S$ concentration is higher than 2% by volume, the oxidation bed is cooled or the $H_2S$ concentration is reduced by dilution of the gas with, for example, a recycling gas stream to prevent oxidation of the sulfur formed to yield $SO_2$ in the gaseous phase as a result of an increase in temperature from the reaction heat generated.

In the dry oxidation bed, the oxidation to sulfur can be effected by a known per se method using an oxidation catalyst. One example of an oxidation catalyst and the application thereof is described in U.S. Pat. No. 4,311,683.

The method described therein is the Selectox process (R. H. Hass, M. N. Ingalis, T. A. Trinker, B. G. Goar, R. S. Purgason, "Process meets sulfur recovery needs", Hydrocarbon Processing, May 1981, p.p. 104–107). In this process, $H_2S$ is oxidized to S and $SO_2$ using a special catalyst. Approximately 80% of the $H_2S$ supplied is oxidized to elemental sulfur, if water vapor is removed to a substantial extent. Another application of a dry-bed process which is not sensitive to water vapor in the process gas is the absorption of $H_2S$ in an absorption mass as described, for example, in European patent application 0 071 983.

In accordance with a particular embodiment of the process according to the present invention, the oxidation is carried out in a dry bed, using a catalyst comprising a carrier of which under the reaction conditions applied the surface exposed to the gaseous phase does not exhibit alkaline properties with a catalytically active material applied thereto or formed thereon, the specific area of the catalyst being less than 20 m²/g catalyst, and less than 10% of the total pore volume having a pore radius of between 5 and 500 Å. The catalyst generally contains at least 0.1% by weight, calculated on the total mass of the catalyst, of a material that is catalytically active for the selective oxidation of $H_2S$ to elemental sulfur. A preferred catalytically active material is a metal oxide, a mixed oxide of a plurality of metals, or a mixture of metal oxides.

The specific area of the catalyst used in accordance with the above particular embodiment of the process according to the invention is preferably no larger than 10 m²/g catalyst. The substantial absence of micropores, too, is of importance for the results to be obtained by this catalyst: preferably, no more than 2% of the total pore volume will be in the form of pores having a radius of between 5 and 500 Å.

A particularly suitable carrier is alpha-alumina, but silica whose specific area satisfies the above requirements, such as hydrothermally sintered silica, can be suitably applied, too. It is also possible to use non-ceramic materials as carrier material, such as metal mesh, metal mouldings, or packing bodies.

As stated above, the catalytically active material used is preferably a metal oxide, a mixed oxide of a plurality of metals or a mixture of metal oxides. Preferably, however, the catalytically active material used is iron oxide or a mixed oxide of iron and chromium (with a molar ratio of Cr:Fe that is lower than 0.5 and preferably between 0.02 and 0.15).

The active component is preferably present on the carrier in a proportion of more than 1% by weight calculated on the total weight of the catalyst. Best results are obtained with catalysts in which this percentage by weight is between 3 and 10, calculated as the weight of the metal oxide or mixed oxide of two or more metals, and calculated on the total weight of the catalyst.

In this connection it should be emphasized that this concerns the active material present on the carrier. In fact, by sintering or a different method of preparation, a portion of the active material, in particular the metal oxide, may be encapsulated within the carrier, for example, by the sintering of narrow pores. The difference between this encapsulated or embedded metal oxide and the metal oxide present on the carrier, however, can be readily determined by the socalled temperature-programmed reduction (TPR). Details of this measuring technique are described in N. W. Hurst, S. J. Gentry, A. Jones and B. D. McNicol, Catal.Rev.Sci.Eng 24(2), 233–309 (1982). The amount of metal oxide present on the carrier and accessible to gases can thus be determined. The catalysts preferably used in the particular embodiment of the process according to the present invention can in principle be prepared using known methods of preparing supported catalysts. With regard to such preparation, however, in view of the unusually small specific area and low microporosity of the catalysts, specific measures should be taken, to ensure, in particular, that the porosity is not increased during preparation.

Particular care is required in homogeneously applying the catalytically active material to the carrier material, while in addition it should be ensured that this homogeneity is maintained during and after the drying procedure.

In order to satisfy these requirements, in the preparation of the catalyst, the carrier material with a small specific area is impregnated under dry conditions with a complex solution. This method is known by the name of incipient wetness method. The complex solution comprises the cations of the active materials complexed in the solution with an organic molecule. Also added to the solution is a quantity of a viscosity increasing compound, such as hydroxyethyl cellulose. By impregnating the carrier material with this complex solution by means of the incipient wetness method, a low-area catalyst is obtained, to which the active material is applied highly homogeneously, and whose microporosity has not increased as compared with the starting carrier material. During the drying procedure, the temperature must be increased very slowly to maintain homogeneity. Finally, a sintering treatment is carried out with the catalyst, whereby micropores are sealed. Electron micrographs, porosimetric measurements, B.E.T. measurements and reactor experiments show whether the catalysts satisfy the requirements.

The use of the catalyst described above for the oxidation in a dry bed of the hydrogen sulfide containing residual gases obtained using the process according to the present invention has the important, in particular economic, advantage that such a catalyst is practically insensitive to the presence of water vapor in the residual gas, so that the removal of sulfur and water vapor from this residual gas is unnecessary.

It has been found that—with a view to a maximum sulfur recovery percentage—the choice of the optimum volume percent of $H_2S$ in the residual gas is dependent on the extent of the efficiency of the last oxidation from $H_2S$ to sulfur in the dry oxidation bed. When the efficiency to sulfur of the catalyst used therein is 80–85%, preferably a volume percentage of $H_2S$ in the residual gas of 0.8–1.7 is selected. When the efficiency is 85–90%, preferably a percentage of 1.0–2 is selected, and when the efficiency is 90–95%, the volume percentage of $H_2S$ in the residual gas is preferably adjusted between 1.4 and 2.4.

The liquid oxidation, too, can take place using a known process. Examples of known processes are the Stretford process (The Chemical Engineer, February 1984, pages 84 et seq.), the Lo-Cat process of Air Resources Inc. or the Takahax process. Preferably, for the liquid oxidation an $H_2S$ concentration is selected which is not too close to the lower limit of 1–4% by volume, because at a low $H_2S$ concentration the activity of the liquid decreases relatively rapidly by undesired side reactions of residual quantities of $SO_2$.

The control of the oxidation air to the selective oxidation is not critical and hence simple.

The process according to the invention can be carried out in an existing Claus plant and requires only relatively simple modifications of the existing control of the gas streams. In case a 2-stage Claus plant is used, a selective oxidation reactor will have to be provided in the specific embodiment of the present invention, which in relation to the cost involved in other residual gas processing plants is inexpensive. Thus the application of the process according to the present invention leads to considerable economic advantages.

In case a 3-stage Claus plant is used only the third catalytic reactor needs to be arranged as a selective oxidation reactor. Thus in this case too, therefore, a considerable economic benefit is obtained.

The gas leaving the catalytic stage including the selective oxidation catalyst which is substantially insensitive to the presence of water vapor in the gas stream, is ineffective in promoting the establishment of the equilibrium $$2H_2S+SO_2 \leftrightharpoons 2H_2O+3/n\ S_n,$$

and is effective to promote oxidation of $H_2S$ to sulfur in the presence of water vapor (i.e. the tail gas of the SUPERCLAUS process), is introduced into the heat exchanger used in accordance with the present invention. It is ensured, with the aid of the temperature and/or the flow velocity of the cooling medium, that the wall of the heat exchanger has a temperature below the solidification point of sulfur and above the dew point of water, if any, present in the gas. Finally, the deposited sulfur is removed under the influence of gravity.

Preferably, the tailgas of the SUPERCLAUS process to be treated is introduced into a heat exchanger at the lower end thereof, so that the deposited sulfur is removed countercurrent to the gas to be treated.

It is noted that processes and apparatus are known from the prior art, in which use is made of the precipitation of sulfur vapor in solid form.

U.S. Pat. No. 4,526,590, for instance, describes a process and an apparatus for recovering sulfur vapor from Claus process gas. To that end, the process gas is cooled on a cold surface in a heat exchanger, in order to precipitate the greater part of the sulfur vapor in solid form. The heat exchanger is stripped of solid sulfur from time to time through heating. During this heating the precipitated sulfur is brought into the liquid phase, whereafter the sulfur flows out of the heat exchanger. In a second cooling section the water vapor present in the process gas is condensed. Apart from the fact this process is complicated, it is a disadvantage that condensation of process water gives rise to serious corrosion and blockage problems. Accordingly, the process according to U.S. Pat. No. 4,526,590 has not been introduced in practice.

U.S. Pat. Nos. 2,876,070 and 2,876,071 describe a similar process to that described in U.S. Pat. No. 4,526,590, but without the condensation of water vapor. Characteristic of the plants which are used in these processes is the presence of shut-off valves which are periodically closed. When the shut-off valves are in the closed position, the heat exchanger used can be set out of operation for the purpose of removing the solid sulfur from the heat exchanger pipes through heating to above the melting temperature of sulfur.

An important disadvantage of these processes, which is recognized in the art, resides in the presence of shut-off valves in the mainstreams of the plants used. Such shut-off valves lead to high investment costs, cause pressure drops, give rise to problems of operation and maintenance, and are susceptible to malfunction.

On account of the problems associated with the known processes utilizing the precipitation of solid sulfur, more particularly the blockage problems, the prevalent view in the art is that a gas stream to be treated in which residual sulfur is present has to be cooled to a temperature which is at least above the solidification point of sulfur. In that case, the sulfur liquefies. By ensuring that the heat exchanger makes an angle of inclination with the horizontal plane, the liquid sulfur can flow down to a sump. In these conventional sulfur condensers, the liquid sulfur flows down in cocurrent with the gas.

If this condensation technique is used, not all of the sulfur is removed from the gas to be treated. This is esentially attributable to the much higher vapor pressure of sulfur in liquid condition in comparison with that of sulfur in solid condition. In the case of sulfur in liquid condition, the vapor pressure is higher by about a factor of 10. Illustrated with values, the sulfur vapor pressure falls from 8.0 Pa at 130° C. to 0.7 Pa at 100° C.

The problems arising in the conventional sulfur condensers and in the known cold heat exchangers do not occur when the process according to the invention is used.

The invention relates to a simple continuous process for removing sulfur from gas streams containing sulfur vapor and/or entrained sulfur particles.

Without wishing to be bound by any particular theory, the following explanation for the process according to the invention is given.

By passing a gas to be treated into an inclined heat exchanger at the lower end thereof and cooling this gas with a cooling medium, the wall of the heat exchanger having a temperature below the solidification point of sulfur and above the dew point of water, if any, present in the gas—all in accordance with the invention—the following processes are expected to occur.

The sulfur will be deposited on the wall in the form of solid, amorphous sulfur or liquid sulfur—all depending on the sulfur supply from the gas phase. The sulfur in liquid form will slowly solidify to form substantially amorphous sulfur. Depending on the interaction between the temperature of the gas and the temperature of the wall, the amorphous sulfur will first pass into sulfur in the monoclinic form. The density of amorphous sulfur, 1.92 g/cm$^3$, is well over 2% lower than the density of monoclinic sulfur. Under further cooling, monoclinic sulfur subsequently forms rhombic sulfur. This phase transition, as mentioned above, is accompanied by a relative large decrease in volume of the crystalline sulfur. As a result of the above-described changes in volume, sulfur crystals will come off the wall and fall out of the heat exchanger under the influence of gravity.

The recrystallization from amorphous sulfur to monoclinic sulfur and then to rhombic sulfur proceeds relatively slowly. As a result, it will take some time for the monoclinic and subsequently rhombic sulfur to form on the cold heat exchanger wall. In particular, sulfur in the rhombic crystal form will come off the wall through shrinkage and then fall down. Normally, the entire heat exchanger wall will first be covered with solid sulfur.

As is known, sulfur in solid form has a strongly insulating effect. This contributes to the circumstance that sulfur which is in direct contact with the wall will not be strongly heated by the hot gas which is being passed through the heat exchanger, so that this solid sulfur will adopt the temperature of the wall and thus will pass into the rhombic form sooner. On the side of the sulfur layer which is in contact with the hot gas, a stable condition is established, where sulfur vapor and sulfur particles to be further separated do not sublime (solidify), but condense. This liquid sulfur of a temperature of about 114.5° C. will flow down.

According to the process of the invention, an effective sulfur separation is realized in the tailgas of a SUPER-CLAUS process by means of a combination of solidification, settlement and condensation, which process need only be interrupted occasionally to remove an excess of solidified sulfur from the heat exchanger so as to prevent total blockage. If the temperature of the gas leaving the heat exchanger rises above about 120° C., not all of the sulfur will be deposited on the heat exchanger wall anymore. For the (automatic) control of the cooling of the heat exchanger, use can be made of the variation in the temperature of the output gas.

As cooling medium, air, water or any other suitable medium can be used. Heated cooling air or heated cooling water can often be used for other purposes. For instance, heated air can be used as combustion air for a thermal or catalytic after-burner.

Depending on the cooling medium used and the temperature of the cooling medium, cocurrent or countercurrent cooling can be used. When outside air is used as cooling medium, use is preferentially made of cocurrent cooling, in order to avoid the wall temperature falling below the dew point of water, if any, present in the gas to be treated.

As stated above, the temperature and/or the flow velocity of the cooling medium are chosen such that the water dew point of the process gas is not attained. This means that the temperature of the process gas and of the cooling wall should remain at least so high that no condensation of water arises. It will be clear that this is a limitation with regard to the amount of sulfur which can be separated per unit time and per unit area. However, it is of crucial importance to prevent condensation of water.

In fact, it is well known that acid gases, and particularly $SO_2$, are soluble in water and so can create a condensate with a very high degree of acidity. This condensate is particularly corrosive, and requires acid-resistant and hence expensive construction materials. Moreover, $H_2S$ and $SO_2$, which compounds are both present in the gas to be treated, react with each other in the aqueous phase to form elemental sulfur. This elemental sulfur gives, in water, a colloidal solution, the so-called Wackenroder solution, which cannot be economically processed.

The water dew point depends on the composition and the pressure of the gas to be treated and is easy to determine experimentally. For process gas coming from a Claus plant, which generally contains about 30 vol. % water vapor, the water dew point is about 70° C. at atmospheric pressure.

The SUPERCLAUS process tailgas is, in accordance with the process of the invention, substantially cooled to a temperature between the water dew point and 120° C., the temperature at which sulfur liquefies.

It is preferred to ensure that the wall has a temperature which is at least 2° C. above the dew point of the water. This temperature margin compensates fluctuations in the composition of the gas to be treated and hence in the dew point of water. At the same time this margin provides the advantage of preventing condensation of sulfurous acid, $H_2SO_3$, the dew point of which is just above that of water.

In a preferred embodiment of the process according to the invention, it is ensured that the heat exchanger wall has a temperature of at most 95.5° C. Possibly, monoclinic sulfur then passes into the rhombic form.

The process according to the invention can be suitably practiced if the gas to be treated which is passed to the heat exchanger has a temperature between 120° C. and 300° C.

The heat exchanger which is used in the present invention can essentially be any heat exchanger or sublimator, as long as the gas to be treated can be introduced at the underside and the solid or liquid sulfur can be discharged under the influence of gravity. Highly suitable is the use of a tube or plate heat exchanger.

Such a tube or plate heat exchanger has to be positioned at a slant, the angle with the horizontal plane being preferably more than 45°; and more preferably more than 60°.

A preferred embodiment of the process of the invention is characterized in that the tube or plate heat exchanger is disposed vertically.

In the case where a heat exchanger is used which comprises vertically disposed pipes or plates, the separation of sulfur is promoted when the gas stream through the heat exchanger is turbulent. This makes for optimum contact between the gas and the wall which may or may not be covered with sulfur.

In general, it is to be ensured that the gas velocity is sufficiently high to maintain a Reynolds number greater than 2000–3000. Too high a gas velocity prevents the formed liquid sulfur from flowing out of the heat exchanger under the influence of gravity, since the gas stream is countercurrent to the sulfur to be discharged.

A turbulent gas flow is not a prerequisite for pipes or plates which slant. In that case, the gas flow may be laminar, since the elemental sulfur which is present in the gas stream will reach the wall anyhow.

Further, it is advantageous if a heat exchanger is used of which the walls have an absolute roughness of less than 0.05 mm, since upon recrystallization to the rhombic crystal form the sulfur will come off most readily in a heat exchanger with walls which are as smooth as possible.

In order to increase the cooling surface in a heat exchanger, projections may be provided on or in the wall of the heat exchanger. The shape of these projections is not critical as long as it is ensured that fragments of solid sulfur are not blocked when being removed under the influence of gravity. Projections which are eligible for the purpose may, for instance, be pointed and downwardly directed.

The process according to the invention results in an effective sulfur separation by means of a combination of solidification, settlement and condensation. This process is, in principle, implemented continuously.

It remains possible, however, that a malfunction occurs occasionally. If such malfunction gives rise to a blockage, it can be simply and quickly removed. The cooling of the heat exchanger can be switched off or a fluid of a high temperature can be passed through the cooling system in order to ensure that the solid sulfur passes into the liquid form and can flow away. This step is suitably carried out in a time so short as to make it unnecessary to stop the sulfur removal process.

If the solid sulfur does not come off the wall of the heat exchanger, this process can be accelerated by vibrating the heat exchanger in its entirety from time to time by means of a suitable vibrating device.

The dimensions and form of the heat exchanger are not critical as long as such a distance remains between the walls of the heat exchanger that a stable equilibrium can be established without giving rise to blockage.

Preferably, heat exchangers which are used in the process according to the invention are manufactured from corrosion-resistant materials. Highly suitable materials are aluminum and stainless steel.

The process according to the present invention will now be described in more detail with reference to the accompanying FIGS. 1–5.

Figure 1:
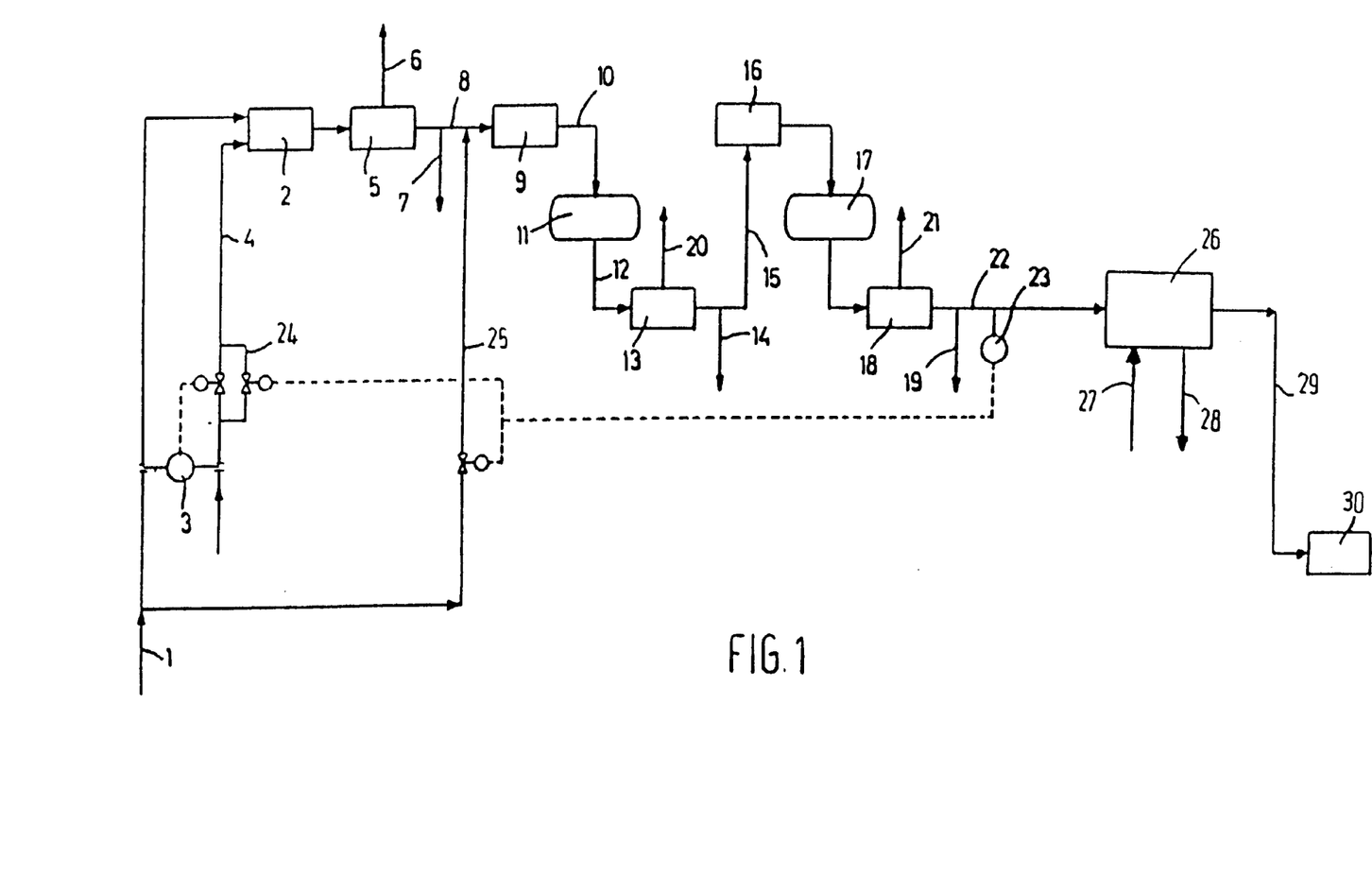

As shown in FIG. 1, the feedstock gas (=Claus gas) is supplied through line 1 to the Claus burner with combustion chamber 2. The amount of combustion air, controlled by the quantity-proportion regulator 3 and $H_2S$ analyzer 23, is supplied to Claus burner 2 through line 4. The heat generated during the combustion (1200° C.) of the Claus gas is dissipated in a boiler heated by spent gases, producing steam that is discharged through line 6.

The Claus reaction takes place in the burner and the combustion chamber. The sulfur formed is condensed in boiler 5 (150° C.) and discharged through line 7. The gas is passed through line 8 to a heater 9 where it is heated to the desired reaction temperature of 250° C. before being supplied through line 10 to the first Claus reactor 11. In reactor 11 the Claus reaction takes place again, whereby sulfur is formed. The gas is discharged through line 12 to the sulfur condenser or 13. The condensed sulfur (150° C.) is discharged through line 14. Thereafter the gas is passed through line 15 to the next reactor stage, which again includes a heater 16, a reactor 17 and a sulfur condenser 18. In this reactor the Claus reaction takes place again. The condensed sulfur (150° C.) is discharged through line 19. The steam generated in the sulfur condensers is discharged through lines 20 and 21.

The $H_2S$ concentration in the residual-gas line 22 is controlled by an $H_2S$ analyzer 23 to a range of from 0.8 to 5% by volume. The $H_2S$ analyzer controls a control valve in combustion air line 24 or a control valve in the $H_2S$ line 25. Through line 25 a portion of the $H_2S$ can be passed direct to the first catalytic stage 11, by-passing the thermal stage.

The residual gas is passed through line 22 to the sulfur removing stage 26. This sulfur removing stage may be a known sulfur removing process, such as, for example, a dry-bed oxidation stage, an absorption stage or a liquid-oxidation stage. The air required for the oxidation is supplied through line 27. The sulfur formed is discharged through line 28.

The gas is then passed through line 29 to heat exchanger 30.

Figure 2:
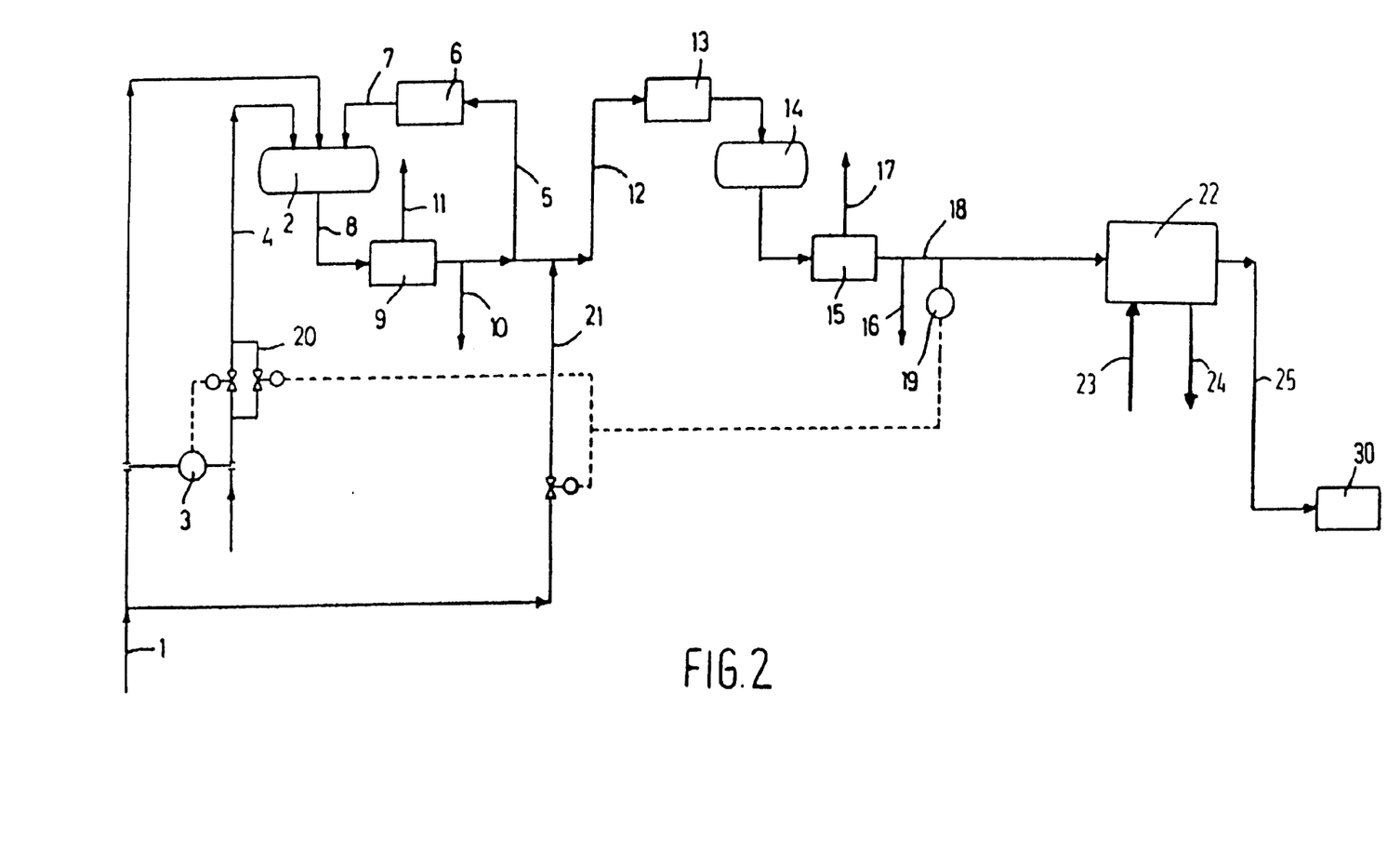

As shown in FIG. 2, a lean Claus feedstock gas is supplied through line 1 to an oxidation reactor 2. An amount of oxidation air controlled by the quantity-ratio regulator 3 and $H_2S$ analyzer 19 is passed to the oxidation reactor through line 4. In the oxidation reactor a portion of the $H_2S$ is oxidized over a special catalyst to form $SO_2$ whereafter the Claus reaction takes place.

To prevent an unduly high temperature from arising within the oxidation reactor, as a result of the reaction heat, a quantity of gas is recycled by means of blower 6 through lines 5 and 7. The gas from reactor 2 is passed through line 8 to sulfur condenser 9, where the sulfur formed during the reaction is condensed at 150° C. and discharged through line 10. The heat generated during the reaction is dissipated in sulfur condenser 9 with generation of steam, which is discharged through line 11. The gas is passed through line 12 to a heater 13, where it is heated, for example, to 220° C. before being supplied to the Claus reactor 14. In reactor 14, the Claus reaction takes place again, whereby sulfur is formed. In condenser 15, the sulfur is condensed at 150° C. and discharged through line 16, and steam generated is discharged through line 17. The $H_2S$ concentration in the residual gas line 18 is controlled by an $H_2S$ analyzer 19 to a range of from 0.8 to 5% by volume. The $H_2S$ analyzer controls a control valve in the combustion-air line 20, or a control valve in $H_2S$ line 21.

Through line 21, a portion of the $H_2S$ can by-pass the oxidation stage and pass direct to the catalytic stage 14.

The residual gas is passed through line 18 to the sulfur removing stage 22. The air required for the oxidation is supplied through line 23. The sulfur formed is discharged through line 24. The gas is then passed through line 25 to a heat exchanger 30.

Figure 3A:
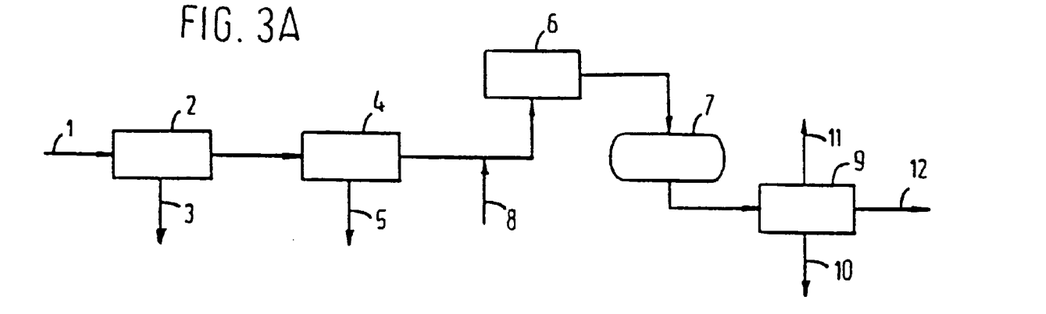
Figure 3B:
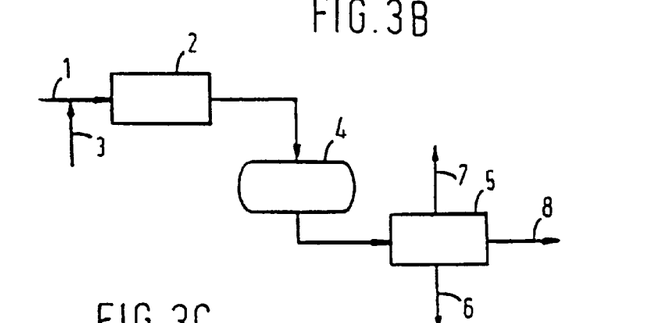
Figures 3C, 3D:
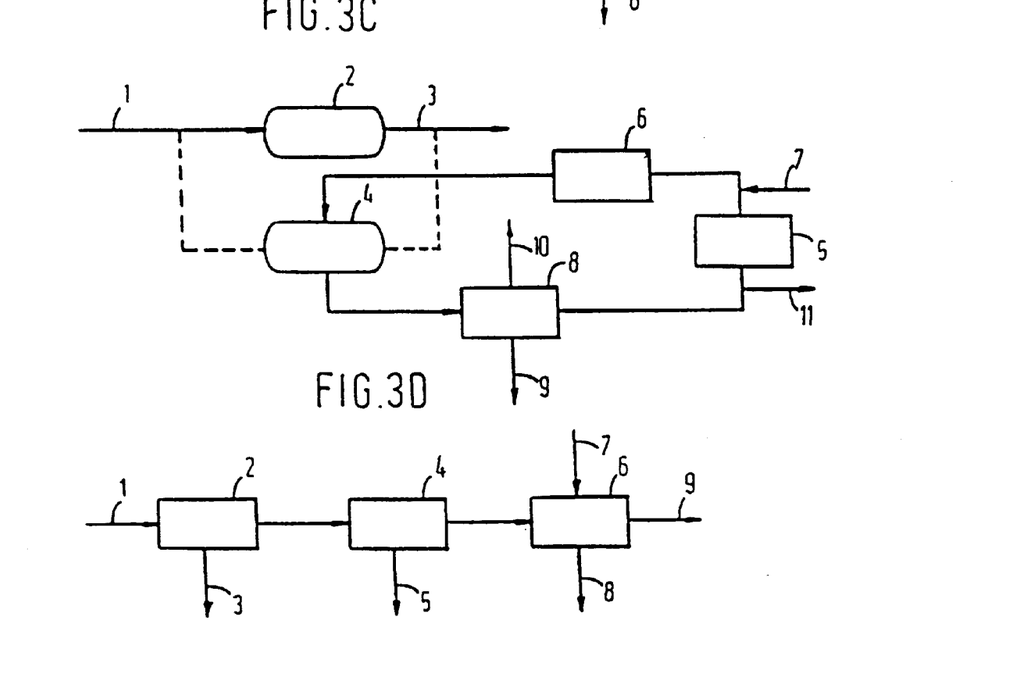

FIG. 3 shows in greater detail the oxidation or absorption in a dry bed and the oxidation in a liquid as indicated more generally in 26 of FIG. 1 or 22 of FIG. 2. In FIGS. 1 and 2 the residual gas is supplied through lines 22 and 18, respectively; in FIG. 3, the residual gas is supplied through line 1.

In FIG. 3a, after the removal of the sulfur from the residual gas in separator 2, which is discharged through line 3, and the condensation of the water in 4, which is discharged through line 5, the gas is supplied through a heater 6 to a selective oxidation reactor 7. The removal of sulfur and water in 2 and 4 respectively, can take place using a known method, for example, as disclosed in U.S. Pat. No. 4,526,590. In the selective oxidation reactor 7, a catalyst may be provided, for example, as described in the French patent publications 8009126, 8105029 or 8301426. The required oxidation air is supplied through line 8.

From the reactor, the gas flows to a sulfur condenser 9. The sulfur condensed is discharged through line 10, and the steam generated through line 11. The gas next flows through line 12 to the heat exchanger as designated by 30 in FIG. 1 and 2.

As shown in FIG. 3b, the residual gas is supplied through line 1 and heater 2 direct to the selective-oxidation stage, that is to say, without a preceding sulfur and water removing stage. This embodiment can be used when a catalyst is present in the oxidation reactor 4, as described above, consisting of a non-alkaline ceramic carrier to which at least 0.1% by weight of a catalytically active material, in particular a metal oxide, has been applied, so that the specific area of the catalyst is less than 20 $m^2/g$, while less than 10% of the total pore volume has a pore radius of between 5 and 500 Å. The oxidation air required is supplied through line 3. The sulfur condensed in sulfur condenser 5 is discharged through line 6 and the steam generated through line 7. The gas next flows through line 8 to the heat exchanger designated by 30 in FIGS. 1 and 2.

As shown in FIG. 3c the residual gas is passed through line 1 to a reactor 2 filled with an absorption mass, for example, as described in European patent application 0 071 983. In reactor 2, the hydrogen sulfide is removed from the residual gas by absorption. The gas next flows through line 3 to the heat exchanger, designated by 30 in FIGS. 1 and 2. When the bed is saturated, it is regenerated. Reactor 4 is connected in parallel to reactor 2 and is regenerated. By means of a circulation blower 5, a quantity of gas is circulated. This gas is heated in heater 6. The air required for the oxidation is supplied through line 7. The gas flows from reactor 4 to sulfur condenser 8. The sulfur condensed is discharged through line 9 and the steam generated through line 10. To keep the system at the required pressure, a small gas stream is discharged through line 11 and recycled to the feedstock for the Claus plant (line 1 in FIGS. 1 and 2).

As shown in FIG. 3d, sulfur is removed in separator 2, which is discharged through line 3. Subsequently, in condenser 4, water is condensed which is removed through line 5. The gas is passed to the liquid-oxidation stage 6. The oxidation stage may contain, for example a basic solution of sodium carbonate, ADA (anthraquinone disulphonic acid) and sodium metavanadate, as used in the well-known Stretford process.

$H_2S$ is absorbed in the liquid and subsequently oxidized with air. The oxidation air is supplied through line 7 and the sulfur formed is discharged through line 8. The gas next flows through line 9 to the heat exchanger 30 in FIGS. 1 and 2.

Figure 4:
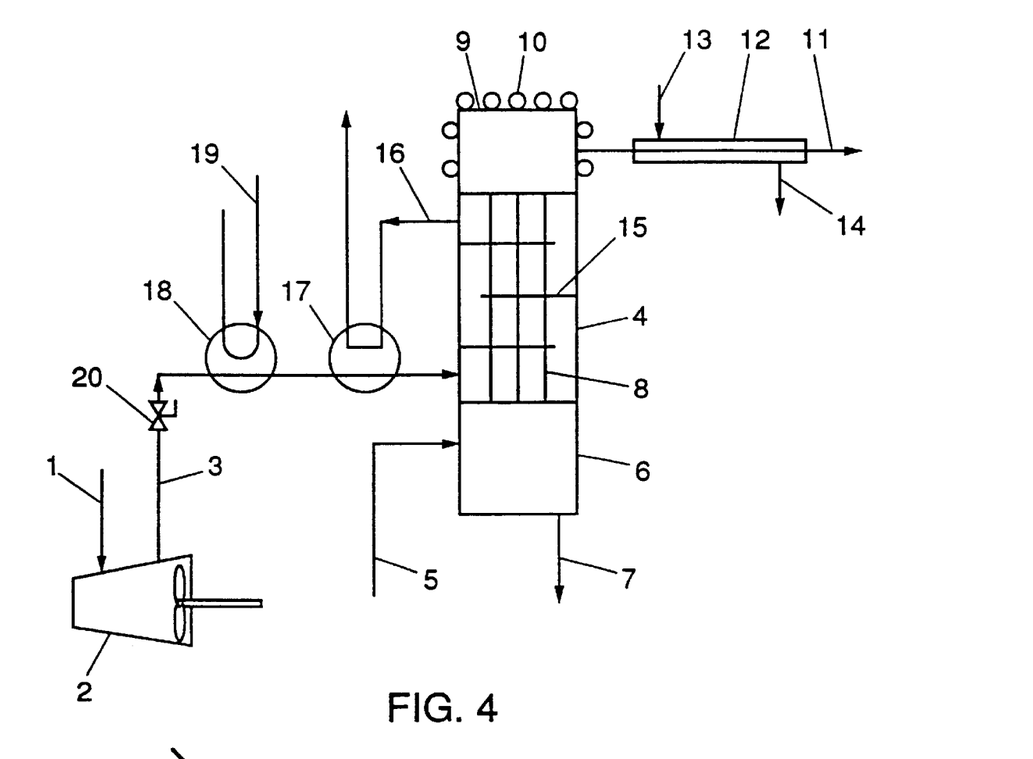
Figure 5:
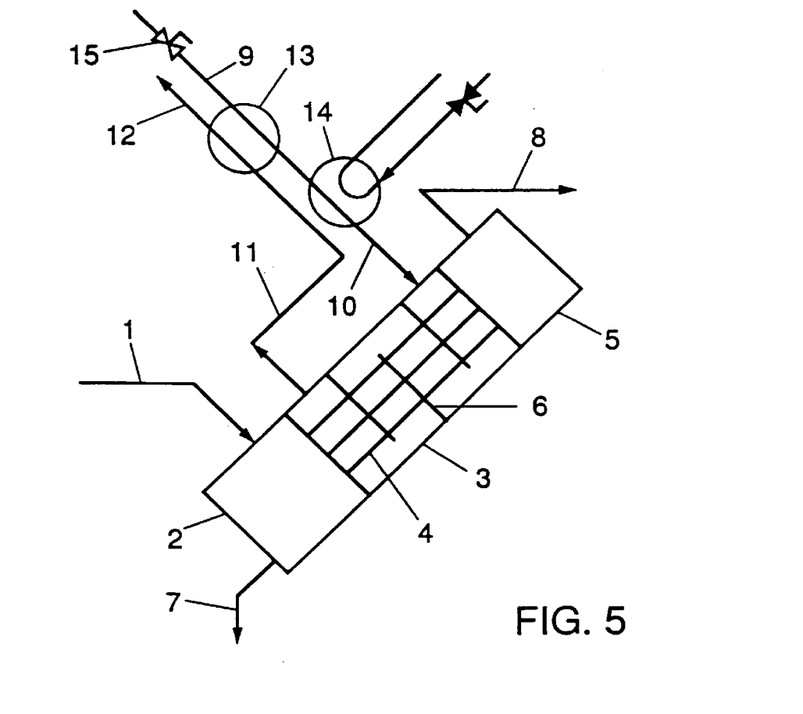

FIG. 4 shows an embodiment of the invention in which a vertically disposed heat exchanger is used; and FIG. 5 shows another embodiment, where use is made of an inclined heat exchanger.

In FIG. 4 outside air is sucked in through pipe 1 by fan 2, which passes sufficient cooling air in cocurrent cooling by way of pipe 3 through heat exchanger 4 (30 in FIGS. 1 and 2).

Preheater 18 and/or heat exchanger 17 provide an appropriate air inlet temperature of the cooling air, in order to avoid condensation of water vapor on the inlet side of the process gas.

The process gas to be cooled, which contains sulfur vapor and entrained sulfur particles, is fed through pipe 5 to inlet chamber 6 of the heat exchanger 4.

The condensed sulfur is discharged through pipe 7. The process gas is passed through the heat exchanger pipes 8 to the outlet chamber 9, which comprises steam heating coils 10. The outlet chamber of the heat exchanger comprises a heating element to prevent the deposition of solid sulfur.

The process gas leaves heat exchanger 4 through pipe 11, which is provided with a steam heating jacket 12 to which steam is fed through pipe 13. The condensate of this steam heating is discharged through pipe 14.

The cooling air flows in cocurrent through heat exchanger 4, partitions 15 ensuring that a proper heat transfer takes place between the cooling medium and the process gas. The heated air leaves heat exchanger 4 through pipe 16.

The amount of cooling air to be supplied is controlled with control valve 20, in such a manner that the heated cooling air in pipe 16 has a temperature such as to also prevent any water condensation in the outlet of heat exchanger 4 on the process gas side.

The air preheater 18 can be used to strip the heat exchanger of solidified sulfur, if necessary. To that end, through pipe 19 steam is fed to the air preheater 18 and the outside air is further raised in temperature before being passed through the heat exchanger 4.

The embodiment outlined in FIG. 5 utilizes cooling with cooling water as cooling medium, which is supplied countercurrent to the gas to be cooled.

The process gas to be cooled is fed to heat exchanger 3 (30 in FIGS. 1 and 2) through pipe 1 and then passed through pipes 4 of heat exchanger 3. The process gas is introduced through inlet chamber 2, where also the condensed sulfur is discharged through pipe 7. The cooled gas leaves the heat exchanger 3 through outlet chamber 5 and pipe 8. The cooling water is supplied through pipe 9 and brought to the proper temperature with heat exchanger 13 and steam heater 14.

The cooling water traverses heat exchanger 3 along the outside of the cooling pipes 4 under the guidance of baffles 6.

The cooling water temperature of the input pipe 10 and output pipe 11 is sufficiently high to avoid water condensation in pipes 4. The cooling water is discharged through pipe 12.

The cooling water flow rate is controlled with valve 15 which is controlled by the cooling water temperature in pipe 11.

With reference to the example, the process according to the invention will be further elucidated.

EXAMPLE

Using the system described in FIGS. 1 and 3B the Claus reaction is conducted in a Claus plant having three catalytic stages. A Claus gas comprising 93.62 vol. % $H_2S$ (corresponding to 67.27 kmol/h), 0.29 vol. % $CO_2$, 1.05 vol. % $H_2$ plus hydrocarbons and 5.04 vol. % $H_2O$ together with 32.00 kmol/h $O_2$(5.0% stoichiometric deficiency) in the form of air oxygen are introduced into the thermal stage. The volume percentage $H_2S$ in the residual gas leaving the third catalytic stage was found to be 0,99 vol. %, the $SO_2$ content being 0.035 vol. % and the water content being 33.1 vol. %.

The dry bed oxidation was conducted with a water-insenstivie oxidation catalyst having an oxidation efficiency of 92%.

Subsequently, the process gas is introduced in a heat exchanger as depicted in FIG. 4. This gas, introduced in an amount of 231.41 kmol/h, had a temperature of 130° C., a pressure of 1.05 bar absolute and contained 4.2 kg/h sulfur vapour and 4.3 kg/h sulfur particles in the form of small droplets. Preheated ambient air was used as the cocurrent cooling agent.

The cooling air amount was 10,000 kg/h. The air had an introduction temperature of 54° C. The heat exchanger comprised 42 smooth, vertically positioned aluminum pipes having a pipelength of 2.3 meters and an internal diameter of 46 mm. These conditions lead to a turbulent flow profile. The process gas was cooled to 109° C.

The amount of cooling air was controlled dependent on the process gas exit temperature of the sulfur present in the process gas in the form of sulfur vapour and sulfur droplets 6.8 kg/h was removed from the process gas, which is 80% of the sulfur introduced. The major amount of the sulfur flowed out of the heat exchanger in the form of liquid sulfur. This leads to an overall sulfur recovery percentage of 99.55%.

The heat exchanger was regenerated every three weeks by increasing the cooling air temperature to 138° C. using an air preheater.

During a regeneration procedure of 15 minutes the solid sulfur present in the pipes was molten and drained away.

We claim:

1. In a process for the recovery of sulfur from a hydrogen sulfide containing gas comprising the steps of:

partially oxidizing hydrogen sulfide in a gaseous stream with oxygen in an oxidation stage to produce $SO_2$ and non-oxidized $H_2S$;

reacting the product gases of said partial oxidation stage further in at least two catalytic stages, in accordance with the equation:

$$2H_2S+SO_2 \leftrightarrows 2H_2O+3/n\ S_n,$$

wherein the $H_2S$ concentration in the gas leaving the last of said at least two catalytic stages is controlled to have a value ranging between 0.8 and 3% by volume by employing at least one: of the following steps a and b:

a) reducing the quantity of combustion or oxidation air passed to said oxidation stage;

b) causing a portion of the hydrogen sulfide containing feedstock gas to by-pass the oxidation stage and to be added to the gas flowing to one of said at least two catalytic stages;

following by selectively oxidizing $H_2S$ in the gas stream leaving the last of said at least two catalytic stages to sulfur, employing for this purpose a catalytic stage including a selective oxidation catalyst which is substantially insensitive to the presence of water vapor in the gas stream, is ineffective in promoting establishment of the equilibrium $$2H_2S+SO_2 \leftrightarrows 2H_2O+3/n\ S_n,$$

and is effective to promote oxidation of $H_2S$ to sulfur in the presence of water vapor;

the improvement comprising subsequently introducing the gas stream leaving said catalytic stage including said selective oxidation catalyst into the lower end of an inclined tube or plate heat exchanger, said heat exchanger being inclined from the horizontal plane by an angle greater than 45°, a tube or plate of said heat exchanger having an inner wall, said inner wall of said heat exchanger tube or plate being maintained, throughout the entire length of the heat exchanger, at a temperature below the solidification point of sulfur and above the dew point of water in the gas stream by flow of a coolant;

cooling the upwardly flowing gas stream in the heat exchanger, so as to establish a deposited layer of solid sulfur on the gas stream side of said inner wall;

continuing to cool said upwardly flowing gas stream by said flow of said coolant so that, after said solid elemental sulfur layer is established on said inner wall, elemental sulfur condenses as a liquid onto said solid sulfur layer; and collecting said condensed liquid elemental sulfur from said heat exchanger by gravity flow while said gas leaving said catalytic stage including said selective oxidation catalyst passes through said heat exchanger, said introducing, continuing to cool and collecting steps being carried out in a continuous mode.

2. The process of claim 1, wherein the $H_2S$ concentration in the gas leaving the last of said at least two catalytic stages is maintained at a value of between 1 and 3% by volume.

3. The process of claim 1, wherein the quantity of combustion or partial oxidation air passed to the oxidation stage is about 86–98.5% of the stoichiometric quantity of air required for optimum conversion of the supplied quantity of hydrogen sulfide to sulfur.

4. The process of claim 1, wherein about 1.5–14% of the available quantity of $H_2S$ containing gas is caused to by-pass the partial oxidation stage and to be added to the gas flowing to one of said at least two catalytic stages.

5. The process of claim 1, wherein, with an oxidation efficiency to sulfur of 80–85% for the selective oxidation catalyst, an $H_2S$ concentration of 0.8–1.7% by volume is selected in the gas coming from the last of said at least two catalytic stages.

6. The process of claim 5, wherein, with an oxidation efficiency to sulfur of 85–90% for the selective oxidation catalyst, an $H_2S$ concentration of 1.0–2% by volume is selected in the gas coming from the last of said at least two catalytic stages.

7. The process of claim 5, wherein, with an oxidation efficiency to sulfur of 90–95% for the selective oxidation catalyst, an $H_2S$ concentration of 1.4–2.4% by volume is selected in the gas coming from the last of said at least two catalytic stages.

8. The process of claim 5, wherein said selective oxidation catalyst includes a carrier of which, under the reaction conditions applied, the surface exposed to the gaseous phase does not exhibit alkaline properties, said carrier having a catalytically active material applied thereto or formed thereon, the specific area of the selective oxidation catalyst being less than 20 $m^2$/g catalyst, and less than 10% of the total pore volume having a pore radius of between 5 and 500 Å.

9. The process of claim 8, wherein less than 2% of the total pore volume of said selective oxidation catalyst are pores having a pore radius of between 5 and 500 Å.

10. The process of claim 8, wherein said selective oxidation catalyst has a specific area less than 10 $m^2$/g catalyst.

11. The process of claim 8, wherein the carrier material employed in the selective oxidation catalyst is alpha-alumina or hydrothermally sintered silica.

12. The process of claim 8, wherein the catalytically active material is present on the carrier of the selective oxidation catalyst in a proportion of 0.1–10% by weight calculated on the total mass of the catalyst.

13. The process of claim 8, wherein the catalytically active material employed in the selective oxidation catalyst is a metal oxide, a mixed oxide of a plurality of metals, or a mixture of metal oxides.

14. The process of claim 13, wherein the catalytically active material is iron oxide or a mixed oxide of iron and chromium.

15. The process of claim 1, wherein the step of selectively oxidizing takes place in a liquid, and with an oxidation efficiency to sulfur of 90–100% in the liquid employed for selective oxidation, an $H_2S$ concentration of 2–4% by volume is selected in the gas coming from the last of said at least two catalytic stages.

16. The process of claim 1, wherein in said step of selectively oxidizing, an excess of oxygen over that required for said selective oxidation step is employed, said excess of oxygen being sufficient to result in an overall excess of oxygen being employed in said process.

17. The process of claim 1, wherein the gas introduced in the heat exchanger is cooled to a temperature between the water dew point and 120° C.

18. The process of claim 1, wherein it is ensured that the inner wall of the heat exchanger has a temperature which is at least 2° C. above the condensation temperature of the water.

19. The process of claim 1, wherein the inner wall of the heat exchanger has a temperature of at most 95.5° C.

20. The process of claim 1, wherein the gas to be introduced in the heat exchanger has a temperature between 120° C. and 300° C.

21. The process of claim 1, wherein a tube or plate-shaped heat exchanger is used.

22. The process of claim 21, wherein the tube or plate-shaped heat exchanger is disposed vertically.

23. The process of claim 1, wherein a heat exchanger is used of which the walls have an absolute roughness of less than 0.05 mm.

24. The process of claim 1, wherein the catalytic stage and the heat exchanger are combined in one device.

25. The process of claim 1, wherein the gas is cooled in said heat exchanger by cocurrent flow of a coolant.

26. The process of claim 1, wherein the gas is cooled in said heat exchanger by countercurrent flow of a coolant.

* * * * *